Patented May 19, 1942

2,283,520

UNITED STATES PATENT OFFICE 2,283,520

PIGMENTED RESIN GEL AND METHOD OF MAKING

William A. Waldie, Dayton, Ohio, assignor to The Commonwealth Engineering Company of Ohio, Dayton, Ohio, a corporation of Ohio No Drawing. Application October 17, 1940, Serial No. 361,614

13 Claims. (Cl. 106—241)

This invention relates to a pigmented resin gel product useful in compounding paints, enamels, lacquers, inks, plastics, rubber, linoleum and cement.

It is an object of this invention to produce a pigmented resin gel product wherein the pigment is uniformly dispersed throughout the resin to provide an evenly pigmented gel without grinding or milling the pigment in the resin to effect the dispersion of the pigment particles.

Another object of this invention is to devise a method for making pigmented resin gel utilizing the pigments conventionally available and used in the making of paints, enamels, plastics and the like wherein the pigment particles are uniformly dispersed throughout the resinous product.

Another object is to devise a method of dispersing pigment in the form of an aqueous slurry by coating the pigment particles with saponified resin or resinate and thereafter acidifying the resinate and esterifying the acidified product to bring about thorough dispersion of the pigment particles throughout the resinous ester forming a resinous pigment paste.

Another object is to produce a pigmented resin gel composition having a sufficiently high content of pigment dispersed throughout the resin so that the product can be utilized in formulating paints, enamels and similar coating compositions for incorporating suitable amounts of the pigmented resin gel with oil, drier and thinner in the usual manner for making paints and enamels.

Another object is to provide a pigmented resin product which is adapted for use in making printing inks and the like wherein the pigment is incorporated in the resin by saponifying the resin to form a soap and coating the pigment particles with this resinate soap and thereafter esterifying the acidified mixture to prdouce a glyceride oily resinous vehicle in which pigment particles are thoroughly dispersed.

These and other objects and advantages will appear hereinafter in light of the description.

In general, the process of this invention comprises the preparation of a pigmented resin gel wherein the pigment particles are dispersed throughout the vehicle without grinding or milling the pigment with the oil or resinous vehicle. To accomplish this, an acid resin, such as rosin, or a synthetic resinous product having a relatively high acid value is first saponified by heating the resin with caustic soda or alkali hydroxide to form the resinous soap and thereafter the pigment in the form of an aqueous slurry is stirred into the mixture thoroughly to coat the pigment particles with the resinous soap. The batch is then acidified by the addition of weak organic or inorganic acid solution and the pigmented resinous gel precipitated is separated from the water and esterified by the addition of glycerin and by heating the batch to form glycerides of the resinous components or mixture of same as may be desired.

As typical examples of the method of preparing the pigmented resinous gel products of this invention, the following are given:

Example I

| | | |
|---|---|---|
| Rosin | lbs | 25 |
| White lead | lbs | 225 |
| Caustic soda | lbs | 3½ |
| Glycerin | lbs | 3 |
| Acetic anhydride | lbs | 5 |
| Water | gals | 75 |

In compounding the above constituents, the rosin is admixed with the aqueous caustic soda solution which is made up with about two-thirds of the water. This mixture is boiled for about ten to fifteen minutes thoroughly to saponify the rosin and form the resinous soap.

The white lead pigment is then introduced into the mixture in the form of an aqueous slurry comprising the remainder of the water, and the pigment and saponified rosin are boiled for approximately one hour with frequent stirring. After this treatment, acetic anhydride or equivalent weak acid is added to the mixture until the batch is slightly acid to litmus. A precipitate comprising pigment and resinous mixture is formed and the water which separates out is decanted or drained off and discarded. Glycerin is then introduced into the batch and the mixture heated to approximately 260 to 275 degrees F. for about one and one-half hours to esterify the resinous mixture in situ with the pigment forming a resinous pigmented gel in which the pigment is thoroughly dispersed.

The resultant product is a smooth, white lead, resinous gel which is usable in place of the white lead-oil paste made heretofore by grinding or milling the pigment into the oil or resinous vehicle.

Example II

| | | |
|---|---|---|
| Rosin | lbs | 25 |
| Zinc oxide | lbs | 40 |
| Caustic soda | lbs | 3½ |
| Glycerine | lbs | 3 |
| Acetic anhydride | pts | 5 |
| Water | gals | 25 |

The method of compounding the ingredients is similar to that described in Example I and wherein the rosin is first saponified and the pigment slurry introduced therein and the mixture boiled to bring about a thorough coating of the pigment particles with the resinate soap. The mixture is thereafter acidified and after removing the water glycerin is added and the resinous mixture esterified to produce a pigmented resinous gel product.

Example III

| | | |
|---|---|---|
| Rosin | lbs | 25 |
| Lithopone | lbs | 40 |
| Caustic soda | lbs | 3½ |
| Glycerine | lbs | 3 |
| Acetic anhydride | pts | 5½ |
| Water | gals | 30 |

In this example, the ingredients are compounded as set out in Example I and a similar white, lithopone-containing resinous gel is produced wherein the pigment particles are thoroughly dispersed.

Example IV

| | | |
|---|---|---|
| Rosin | lbs | 25 |
| Carbon black | lbs | 5½ |
| Caustic soda | lbs | 3½ |
| Glycerin | lbs | 3 |
| Water | gals | 75 |

The rosin is boiled with caustic soda solution to saponify the rosin and the carbon black previously suspended in a part of the water is stirred into the saponified rosin.

The resultant reaction product is then acidified by slowly stirring in a weak solution of hydrochloric acid (e. g., 0.1NHCl). Upon acidifying the batch the carbon black is precipitated with the resinous components and the water which separates out on standing is drawn off and discarded. Thereafter the glycerin is added to the pigmented resinous mixture and the whole heated to approximately 260 to 275 degrees F. to esterify the mixture forming and/or glycerides of the resinous components in situ with the pigment dispersed therein.

The product formed is a smooth, black resinous gel wherein the carbon black particles are thoroughly dispersed in the ester gum, and this resinous gel is adapted for use in place of the common carbon black paste wherein the pigment has been ground or milled into the vehicle.

Example V

| | | |
|---|---|---|
| Rosin | lbs | 25 |
| Lamp black | lbs | 5½ |
| Caustic soda | lbs | 3½ |
| Glycerin | lbs | 3 |
| Acetic anhydride | lbs | 5 |
| Water | gals | 75 |

The ingredients are compounded together similarly as in the case of Example I to produce a smooth, black gel wherein the lamp black particles are thoroughly and uniformly dispersed in the glyceride resinous vehicle.

In the examples, rosin has been given as a typical resin to be saponified. However, in place of rosin there may be substituted prefused fossil gums such as copal, Congo, kauri and the like, as well as synthetic resins which are adapted for saponification and esterification. Various other pigments and composite mixtures, such as titanium oxide, whiting, iron oxide and the like may be utilized in place of the pigments set out in the examples. Any pigment may be used so long as the heat treatment does not injure or decompose it.

It will be understood that other alkali metal hydroxides may be used in place of caustic soda to saponify the resinous substance employed. Ammonium hydroxide also may be used for this purpose.

Other polyhydric alcohols, such as the glycols, and higher polyhydric alcohols, such as sorbitol, mannitol and pentahydric alcohol may be used in place of glycerin.

Other weak organic and inorganic acids such as formic, propionic, phosphoric, or their acid anhydrides may be used in place of acetic and hydrochloric.

The essential steps in the process of producing the pigmented resinous gel of this invention and which produce the unexpectedly high dispersion of pigment without milling or grinding of the same in the vehicle are the formation of a soap or equivalent wetting agent for the pigment which functions to assist in dispersing the pigment particles throughout the resinous vehicle, and the subsequent esterification of the acidified reaction product in situ with the pigment particles in their dispersed condition, whereupon a smooth paste is produced.

It will be also understood that this invention is not limited to the particular ingredients set out in the examples and that the proportions may be varied as required for different ingredients to produce the product desired.

Having thus fully described my invention, what I claim as new and desire to secure by Letters Patent is:

1. A method of making a pigmented resinous gel comprising reacting a resin with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

2. A method of making a pigmented resinous gel comprising reacting a rosin with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

3. A method of making a pigmented resinous gel comprising reacting a resin selected from the group consisting of rosin, copal gum, Congo gum, kauri gum and synthetic resins of the type adapted for saponification and esterification, with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

4. A method of making a pigmented resinous gel comprising reacting a resin with an alkali metal hydroxide to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

5. A method of making a pigmented resinous gel comprising reacting a rosin with an alkali metal hydroxide to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

6. A method of making a pigmented resinous gel comprising reacting a resin selected from the group consisting of rosin, copal gum, Congo gum, kauri gum and synthetic resins of the type adapted for saponification and esterification, with an alkali metal hydroxide to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

7. A method of making a pigmented resinous gel comprising reacting a resin with an alkali to form an alkali resinate, mixing pigment selected from the group consisting of white lead, zinc oxide, lithopone, carbon black, lamp black, titanium oxide, whiting, iron oxide, in the form of an aqueous suspension into said resinate to thoroughly coat the particles of the pigment and deflocculate the pigment therewith, acidifying the mixture of resinous components having the pigment admixed therewith, removing the water which separates out, adding glycerin, and heating the mixture to esterify the resinous components to produce the glycerides thereof in which the pigment particles are thoroughly dispersed.

8. A method of making a pigmented resinous gel comprising reacting a resin with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding polyhydric alcohols, and heating the mixture to esterify the resinous components to produce the glycerides thereof in which the pigment particles are thoroughly dispersed.

9. A method of making a pigmented resinous gel comprising reacting a rosin with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding polyhydric alcohols, and heating the mixture to esterify the resinous components to produce the glycerides thereof in which the pigment particles are thoroughly dispersed.

10. A method of making a pigmented resinous gel comprising reacting a rosin selected from the group consisting of rosin, copal gum, Congo gum, kauri gum and synthetic resins of the type adapted for saponification and esterification, with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, removing the water which separates out, adding polyhydric alcohols, and heating the mixture to esterify the resinous components to produce the glycerides thereof in which the pigment particles are thoroughly dispersed.

11. A method of making a pigmented resinous gel comprising reacting a resin with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, with a weak acid selected from the group consisting of acetic anhydride, hydrochloric acid, formic acid, propionic acid, phosphoric acid and their acid anhydrides, removing the water which separates out, adding glycerin, and heating the mixture to esterify the resinous components to produce the glycerides thereof in which the pigment particles are thoroughly dispersed.

12. A method of making a pigmented resinous gel comprising reacting a rosin with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, with a weak acid selected from the group consisting of acetic anhydride, hydrochloric acid, formic acid, propionic acid, phosphoric acid and their acid anhydrides, removing the water which separates out, adding glycerin, and heating the mixture to esterify the resinous components to produce the glycerides thereof in which the pigment particles are thoroughly dispersed.

13. A method of making a pigmented resinous gel comprising reacting a resin selected from the group consisting of rosin, copal gum, Congo gum, kauri gum and synthetic resins of the type adapted for saponification and esterification, with an alkali to form an alkali resinate, mixing pigment in the form of an aqueous suspension into said resinate to thoroughly coat the particles of the pigment and deflocculate the pigment therewith, acidifying the mixture of resinous components having the pigment admixed therewith, with a weak acid selected from the group consisting of acetic anhydride, hydrochloric acid, formic acid, propionic acid, phosphoric acid and their acid anhydrides, removing the water which separates out, adding glycerin, and heating the mixture to esterify the resinous components to produce the glycerides thereof in which the pigment particles are thoroughly dispersed.

WILLIAM A. WALDIE.